United States Patent
Johnson et al.

(10) Patent No.: US 11,023,942 B1
(45) Date of Patent: Jun. 1, 2021

(54) ANONYMOUS MARKETPLACE PLATFORM

(71) Applicant: LaVid Technologies Inc., Dover, DE (US)

(72) Inventors: Jesse D. Johnson, Dover, DE (US); John Michael Brannigan, Dover, DE (US)

(73) Assignee: LaVid Technologies Inc., Dover, DE (US)

( * ) Notice: Subject to any disclaimer, the term of this patent is extended or adjusted under 35 U.S.C. 154(b) by 0 days.

(21) Appl. No.: 16/678,896

(22) Filed: Nov. 8, 2019

Related U.S. Application Data

(60) Provisional application No. 62/758,312, filed on Nov. 9, 2018.

(51) Int. Cl.
*G06Q 30/00* (2012.01)
*G06Q 30/06* (2012.01)

(52) U.S. Cl.
CPC ..... *G06Q 30/0615* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 10,659,926 | B1* | 5/2020 | Stanasolovich | H04W 4/029 |
| 2016/0142379 | A1* | 5/2016 | Tawakol | H04L 63/0421 |
| | | | | 726/1 |

* cited by examiner

*Primary Examiner* — Mila Airapetian
(74) *Attorney, Agent, or Firm* — Cooley LLP

(57) ABSTRACT

A computer implemented method includes receiving anonymous entity information from a client device via a network. The anonymous entity information is used to register a user associated with the client device. User supplied anonymous information about the user is received from the network. Sensor signals from the client device are collected from the network. The user supplied anonymous information is combined with the sensor signals to produce an anonymized data package for the user. The anonymized data package is made accessible to vendor machines via the network. Transaction offers from the vendor machines are collected from the network. The transaction offers are supplied to the user device via the network. A selected transaction offer is received from the user device via the network. Network communication between the user device and a vendor machine associated with the selected transaction offer is coordinated.

10 Claims, 10 Drawing Sheets

ANONYMOUS MARKETPLACE PLATFORM

CROSS-REFERENCE TO RELATED APPLICATION

This application claims priority to U.S. Provisional Patent Application Ser. No. 62/758,312, filed Nov. 9, 2018, the contents of which are incorporated herein by reference.

FIELD OF THE INVENTION

This invention relates generally to electronic commerce. More particularly, this invention is directed toward a marketplace platform that allows a user to present anonymized information to receive offers prior to disclosing sensitive personal information.

BACKGROUND OF THE INVENTION

Personal privacy is a growing concern in computer networks. While users are interested in receiving offers (e.g., for a loan, a coupon or other consideration), such users are reluctant to widely disseminate sensitive personal information.

Therefore, it would be desirable to provide a system that allows a user to present anonymized information to receive offers prior to disclosing sensitive personal information.

SUMMARY OF THE INVENTION

A computer implemented method includes receiving anonymous entity information from a client device via a network. The anonymous entity information is used to register a user associated with the client device. User supplied anonymous information about the user is received from the network. Sensor signals from the client device are collected from the network. The user supplied anonymous information is combined with the sensor signals to produce an anonymized data package for the user. The anonymized data package is made accessible to vendor machines via the network. Transaction offers from the vendor machines are collected from the network. The transaction offers are supplied to the user device via the network. A selected transaction offer is received from the user device via the network. Network communication between the user device and a vendor machine associated with the selected transaction offer is coordinated.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
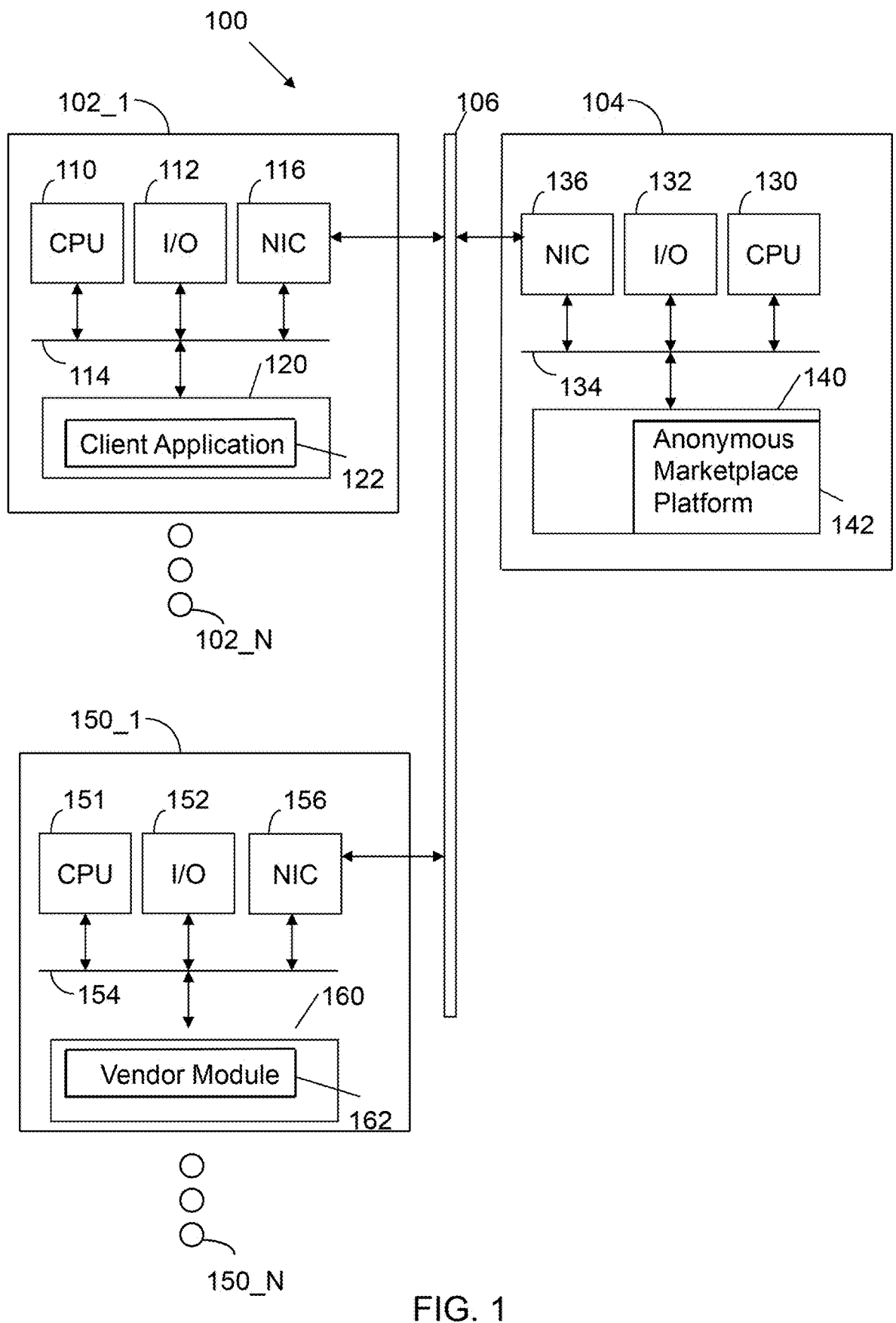
FIG. 1 illustrates a system configured in accordance with an embodiment of the invention.

FIG. 1 illustrates a system 100 configured in accordance with an embodiment of the invention. A set of client devices 102_1 through 102_N communicate with a server 104 via a network 106, which may be any combination of wired and wireless networks. A set of servers 150_1 through 150_N operated by different vendors also communicate with the server 104 via network 106.

Each client device, such as device 102_1, includes a central processing unit or processor 110 that communicates with input/output devices 112 via a bus 114. The input/output devices may include a keyboard, mouse, touch display and the like. The input/output devices 112 may also include various client device sensors, as discussed below. A network interface circuit 116 is also connected to the bus 114 to provide connectivity to network 106. A memory 120 is also connected to bus 114. The memory 120 stores instructions executed by processor 110. In particular, the memory 120 stores a client application 122 that includes instructions executed by processor 110 to collect information about a user and to supply a user with offers, as demonstrated below. More particularly, anonymous information is initially collected. Offers are supplied based upon the anonymous information. After an offer is accepted, sensitive personal information may be disclosed to the vendor of the offer, with the server 104 only storing encrypted content for the sensitive personal information. Accordingly, the sensitive personal information is only disclosed to the vendor of the offer; the sensitive personal information is never made available to the server 104.

Server 104 includes a processor 130, input/output devices 132, a bus 134 and a network interface circuit 136. A memory 140 is connected to the bus 134. The memory 140 stores an anonymous marketplace platform 142 with instructions executed by processor 130 to implement operations disclosed herein, as disclosed in FIG. 2. By way of overview, the anonymous marketplace platform 142 stores anonymous information about a user that is anonymous to the operator of the server 104. Different vendor machines 150_1 through 150_N determine whether the anonymous information merits an offer. If so, the server 104 delivers the offer to the client device 102_1. At that point, the user of the client device may supply sensitive personal information to the vendor, with the server 104 operating as a broker of encrypted information. Alternately, the client device and vendor machine may communicate directly after the server 104 reveals their respective identities. Thus, the server 104 never has access to sensitive personal information of a user.

Each of the vendor servers 150_1 through 150_N includes a processor 151, input/output devices 152, a bus 154 and a network interface circuit 156. A memory 160 is connected to bus 154. The memory 160 stores a vendor module 162 with instructions executed by processor 151 to implement operations disclosed herein. In particular, the instructions provide interfaces to allow a vendor to specify data parameters and rules that merit the supply of an offer based upon an analysis of the anonymous information.

Those skilled in the art will appreciate the many merits of the disclosed system. First, a user obtains offers without disclosing sensitive personal information. Thus, the system facilitates user privacy. Sensitive personal information is only exchanged between the user and the vendor. The disclosed system is advantageous to vendors because they can promulgate offers based upon anonymous information and thereby insulate themselves from charges of bias against a user. The advantages of the system are more fully appreciated with reference to FIG. 2.

Figure 2:
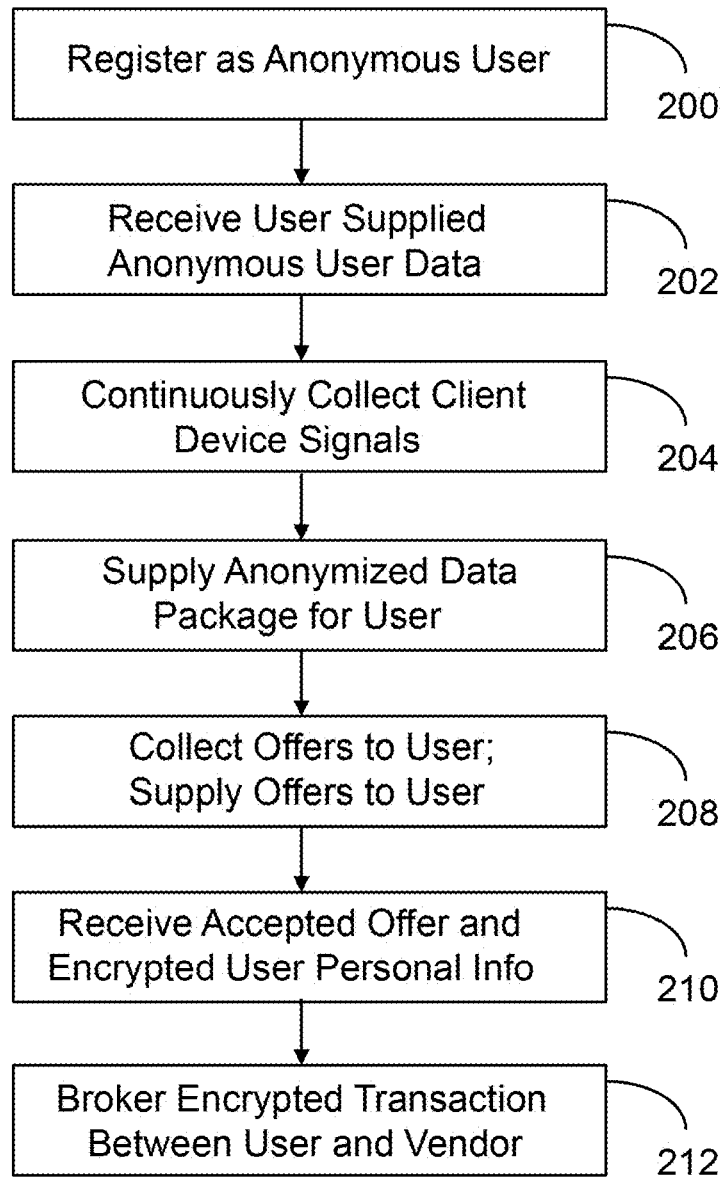
FIG. 2 illustrates processing operations associated with an embodiment of the invention.
Figure 3:
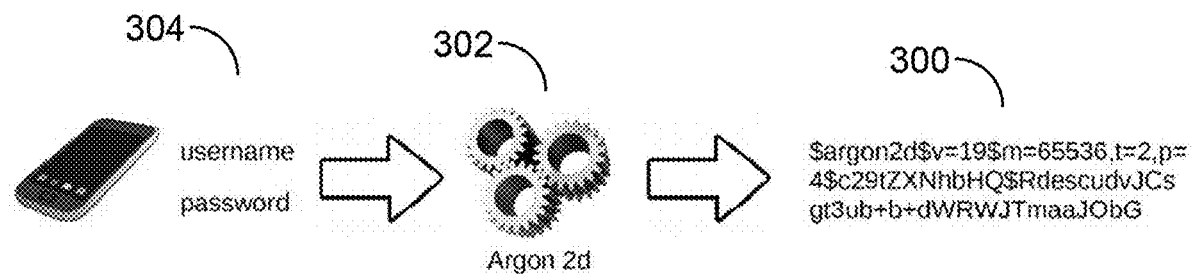
FIG. 3 illustrates an anonymous registration technique utilized in accordance with an embodiment of the invention.

FIG. 2 illustrates processing operations implemented by the anonymous marketplace platform 142. Initially, a user is registered as an anonymous entity 200. For example, as shown in FIG. 3, a user name and password may be converted by the client application 122 to a cryptographic hash. Thereafter, the anonymous marketplace platform 142 utilizes the cryptographic hash to identify the user. FIG. 3 shows a cryptographic hash 300 formed by the Argon 2*d* algorithm 302 based upon a user name and password 304. Argon 2*d* is a one-way cryptographic hash. Other hashing techniques may be used in accordance with alternate embodiments of the invention. Observe that only the client application 122 collects user information. Hackers and law enforcement officials have no way of associating the information on server 104 with any particular individual. In one embodiment, user names may be collected to insure that all user names are unique. A user name alone is not sufficient to derive the cryptographic hash; thus, anonymity is maintained.

Figure 4:
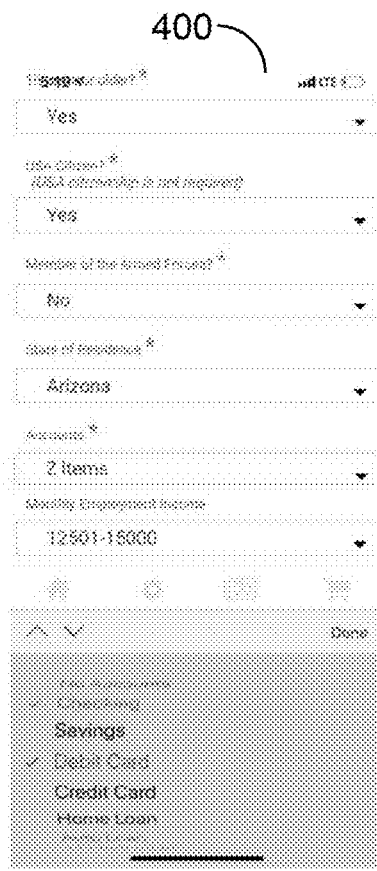
FIG. 4 illustrates anonymous information about a user collected in accordance with an embodiment of the invention.

The next operation of FIG. 2 is to receive user supplied anonymous user data. FIG. 4 illustrates a user interface 400 supplied from anonymous marketplace platform 142 to client application 122. The user interface 400 prompts a user for anonymous profile information, such as age, citizenship, armed forces member, state of residence, number of bank accounts, employment income and the like. This information establishes a profile for a user, but does not identify the user.

Figure 5:
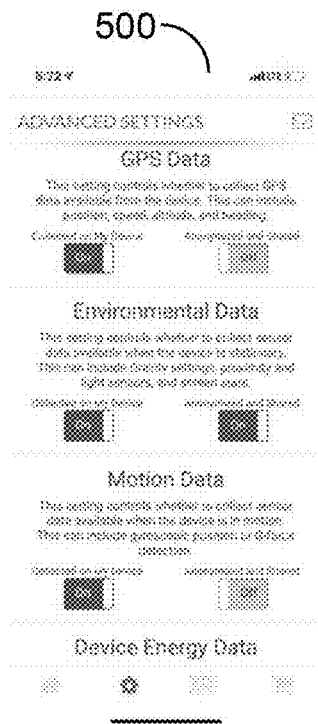
FIG. 5 illustrates user settings for client device signals specified by a user in accordance with an embodiment of the invention.

FIG. 5 illustrates a user interface 500 that allows a user to specify anonymous user data generated by a user device, such as client device 102_1. The user interface 500 allows a user to specify access to client device information, such as GPS data, environmental data, motion data and the like. Thus, client device sensor signals provide additional anonymous information about user habits that may inform a decision to extend an offer to the user. GPS/Geolocation data may be collected, including location, speed, heading, altitude, and activity detection such as walking, jogging, cycling, or driving. Accelerometer, Gyroscopic, and Magnetometric data may be collected, including G forces, device orientation, barometric pressure, temperature, and acceleration/drop detection. Light data may be collected, including ambient lux, proximity, or brightness. Usage data may be collected, including battery levels, charger state, screen state, lock state, network state, data traffic, and other non-PII information. Composite sensor/device data may be collected, including step counters, heart rate monitors, gestures, and facial recognition. Other sensors may be utilized in accordance with embodiments of the invention. Sensor availability is contingent upon the attributes of the client device.

Returning to FIG. 2, the next processing operation is to continuously collect client device signals 204 in accordance with the settings specified in user interface 500. At this point, the anonymous marketplace platform 142 has collected anonymous information about an anonymous user. The anonymous information includes client device signals. All of this information may be supplied as an anonymized data package for a user 206. The vendor machines 150_1 through 150_N may access the anonymized data package and determine whether an anonymous user merits some type of offer.

Figure 6:
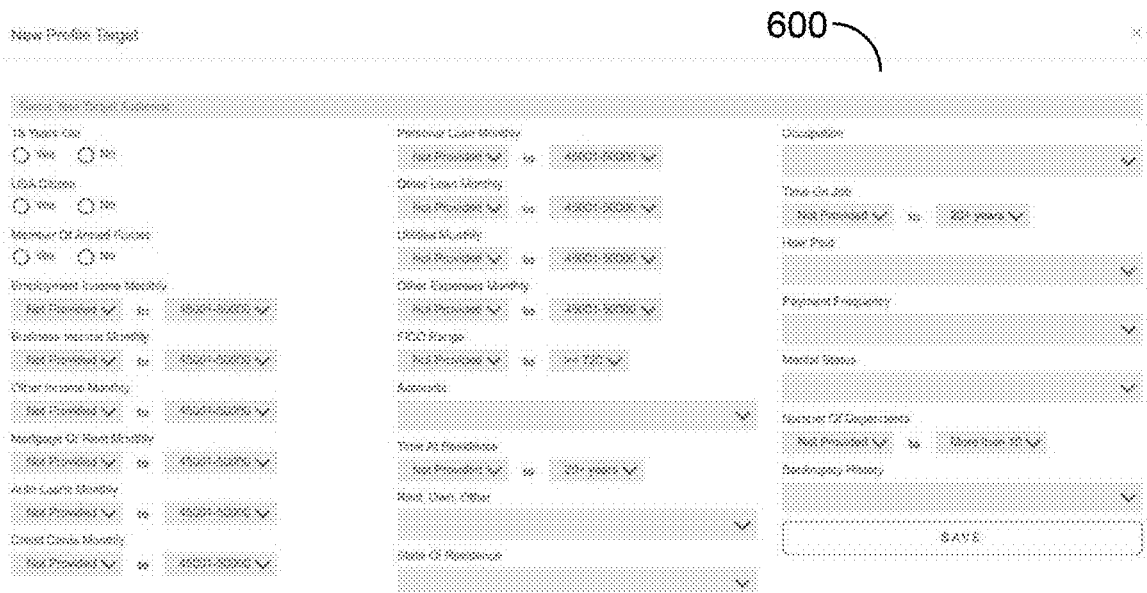
FIG. 6 illustrates a profile target specified by a vendor in accordance with an embodiment of the invention.

FIG. 6 illustrates an interface 600 that may be supplied by the anonymous marketplace platform 142 to one or more vendor machines 150_1 through 150_N. The user interface 600 allows a vendor to specify a profile for an anonymous user. In one embodiment, the interface prompts for parameters, such as age, citizenship, military service, employment income monthly, business income monthly, other income monthly, mortgage or rent monthly, auto loans monthly, credit cards monthly, personal loan monthly, other loan monthly, utilities monthly, other expenses monthly, credit score range, length of time at residence, rent or own, state of residence, occupation, time on job, payment frequency, marital status, number of dependents, bankruptcy history and the like.

Figure 7:
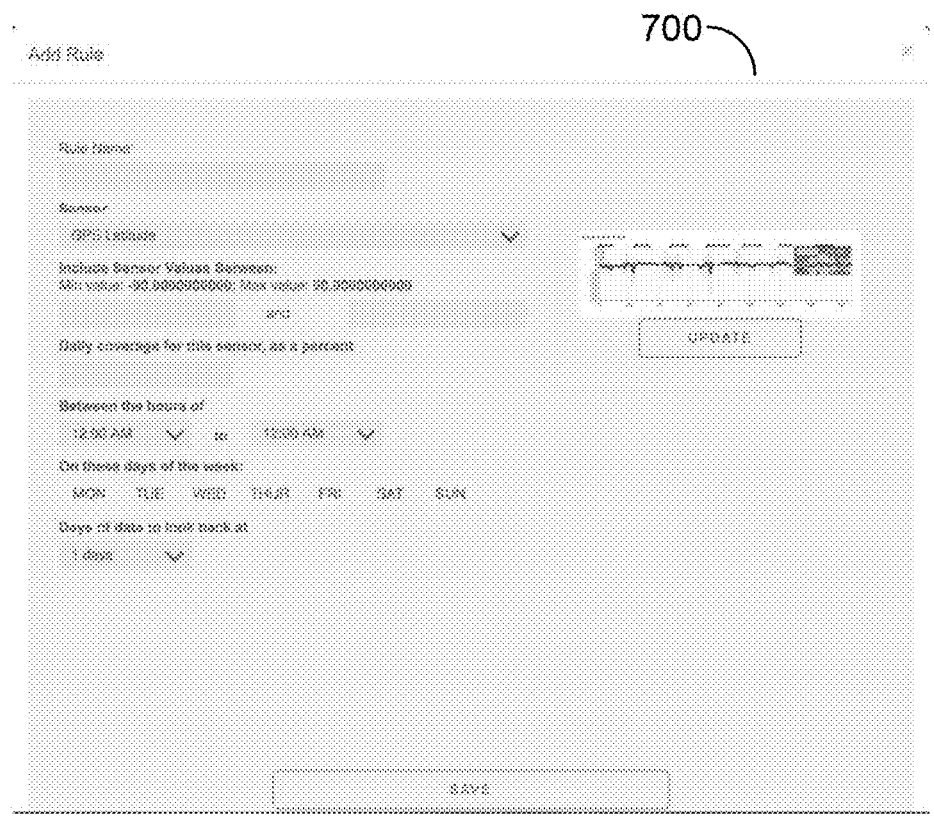
FIG. 7 illustrates a rule specified by a vendor in accordance with an embodiment of the invention.
Figure 8:
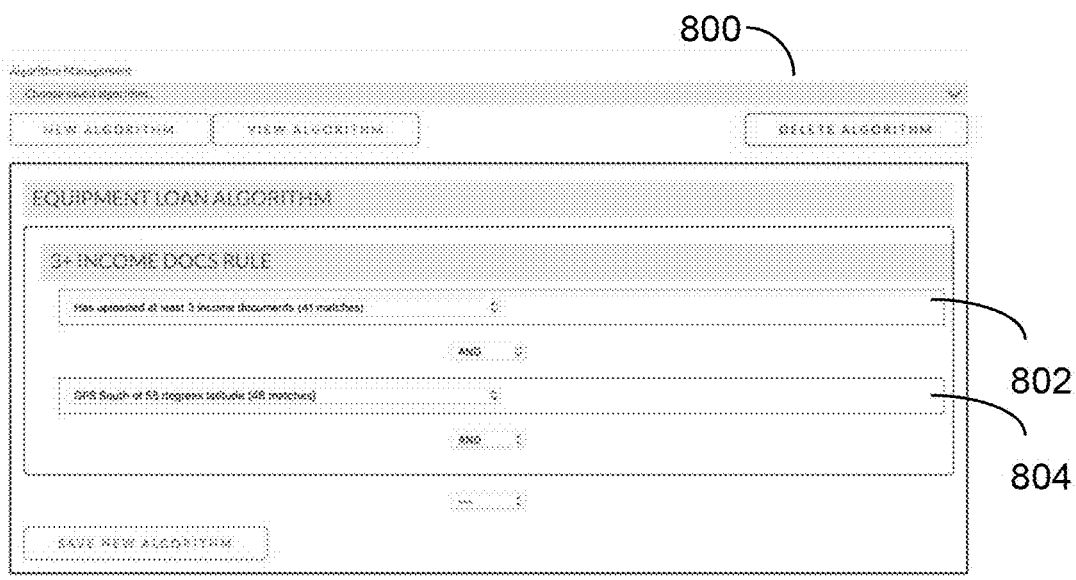
FIG. 8 illustrates rule setting parameters specified by a vendor in accordance with an embodiment of the invention.

FIG. 7 illustrates an interface 700 that may be supplied by the anonymous marketplace platform 142 to one or more vendor machines 150_1 through 150_N. The user interface 700 allows a vendor to specify a rule for analyzing client device signals. The interface 700 may prompt for a type of sensor, a time window for collecting sensor signals, and the like. Such rules may be combined to establish a proprietary data analysis used to determine whether to extend an offer. For example, FIG. 8 illustrates an interface 800 that combines a first rule 802 and a second rule 804 to establish a proprietary data analysis of anonymous user data.

The sensor information allows a vendor to attempt non-traditional data analysis on the sensor data points. For example, one may limit a specific product to users who only drive less than 7 hours per week, and remain under a speed of 50 mph.

The sensor information may be used to identify a user that travels primarily in the US and Canada. This may be implemented as follows.

Group Name: "Speed Checks"
Data Point: "Speed >80 mph in the last 90 days"
AND
Data Point: "Speed >120 mph in the last 12 months"
(group AND)
Group Name: "Between 45 and 55 degrees latitude"
Data Point: "GPS North of 45 degrees latitude" AND
  Data Point: "GPS South of 55 degrees latitude"

The sensor information can also provide insights into time spent at work, time spent at home, exercise habits and the like. Consider the case of a landscaper. The collected data can indicate how many customer accounts he has, how often the services them, how often the visits the nursery, whether the accounts are commercial or residential. This information can be used to estimate income and expenses. This information can be compared with other users with similar profiles to identify statistical variations.

Consider another case where a worker claims she works from nine to five in an office environment. This can be confirmed with geolocation data. Further, one can spot check ambient pressure versus recorded weather at that location. One can monitor ambient light (which doesn't change in office). One can analyze mobile usage during and after work. One can also monitor temperature (office temperature does not materially change). Observe once again that this is a comparison of data between anonymous users and therefore privacy standards are not violated.

Another privacy protection feature associated with an embodiment of the invention is that the sensor information is not provided directly to any vendor. Vendors may use algorithms and profile targets to identify users who match specified criteria, such as shown in FIG. 8. Since sensor data is not shared directly with a vendor, it cannot be used to analyze a user or to cross-reference a user with other available data sources. An embodiment of the invention uses the sensor information to validate user submitted anonymous data.

Figure 9:
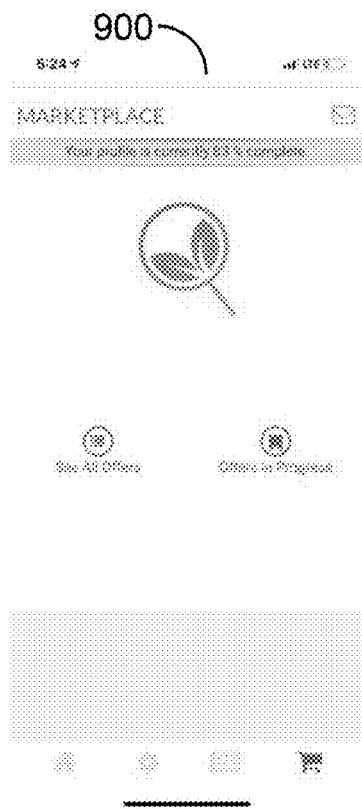
FIG. 9 illustrates a client device interface to access offers.
Figure 10:
FIG. 10 illustrates an interface displaying an offer supplied in accordance with an embodiment of the invention.
Figure 11:
FIG. 11 illustrates an interface displaying an offer in progress that is supplied in accordance with an embodiment of the invention.
Figure 12:
FIG. 12 illustrates an interface displaying an offer in progress that is supplied in accordance with an embodiment of the invention.

Returning to FIG. 2, based upon the foregoing information, offers to a user are collected and are supplied to the user 206. Interface 900 of FIG. 9 is an example of an interface that the anonymous marketplace platform 142 may supply to client device 102_1. The interface allows a user to see all offers and offers in progress. A request to see an offer may result in the anonymous marketplace platform 142 supplying offer details in an interface, such as interface 1000 of FIG. 10, which may be displayed on client device 102_1. The anonymous marketplace platform 142 may also supply information about offers in progress, such as shown in interface 1100 of FIG. 11 and interface 1200 of FIG. 12.

The following is an example of an offer extended in accordance with an embodiment of the invention.

Title: "Personal Loan"
Tagline: "Up to $1,000 instantly"
Payment Methods: Cash, Payroll debit, EFT,
   Maximum Loan Amount: $1,000
   Account Type: Personal Loan
Documents Required: Pay Stubs, Government ID
Rate: 12.00%
   Collateral Required:
   None Fees: $50
   LTV Terms: 90%
   APR: 13.24%
   Loan Length: 12 Months
Terms and Conditions: <as required>
Additional Disclosures: <as required>
Lastly, the Offer Details:
Start Date End Date
Maximum Redemptions
Offer Password. This is the Private Key for the Lockbox
   Encryption, which only the vendor holds.

Returning to FIG. 2, the next operation is to receive an accepted offer and encrypted user personal information 208. The anonymous marketplace platform 142 may broker the transaction 210, for example by collecting encrypted information from the user and supplying the encrypted information and a user public key to a vendor machine. Alternately, the anonymous marketplace platform 142 may simply establish a match between a user and a vendor. Thereafter, the user and vendor may exchange information directly.

Figure 13:
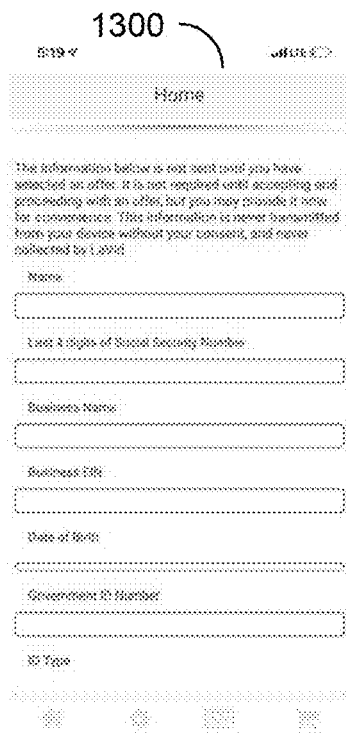
FIG. 13 illustrates an interface to collect sensitive personal information.

FIG. 13 is an example of an interface 1300 that may be used to collect sensitive personal information. The client application 122 prompts the user to enter the information, which is then encrypted using a private key only available on the client device. The encrypted information may then be supplied to platform 104 and/or a vendor machine, such as machine 150_1.

Figure 14:
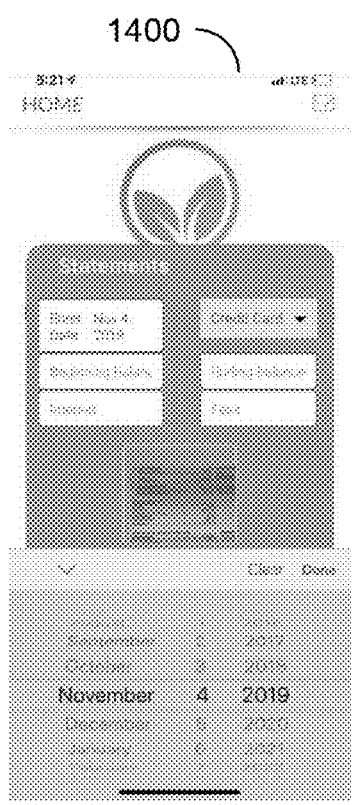
FIG. 14 illustrates an interface to collect sensitive personal information.

FIG. 14 illustrates an interface 1400 that may be used to prompt a user to supply documentation with sensitive personal information. In particular, the user is prompted to use the client device camera to take images of financial documents. This information is also encrypted by the client application 122 prior to sending it to the server 104 and/or a vendor machine. The encrypted sensitive personal information may be prompted in advance of receiving an offer or after receiving an offer.

Figure 15:
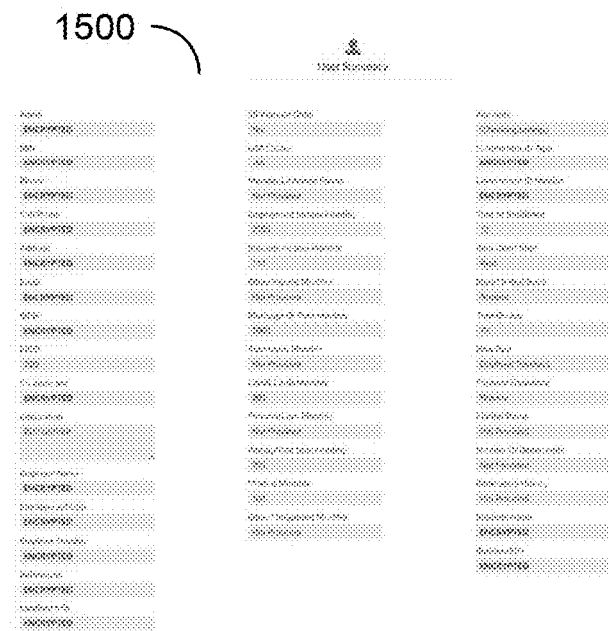
FIG. 15 is an exemplary user profile maintained by the anonymous marketplace platform with exposed anonymous information and encrypted sensitive personal information.

In an embodiment where encrypted sensitive personal information is sent to the anonymous marketplace platform 142, a user profile may be developed, such as shown in interface 1500 of FIG. 15. Observe that the user profile has anonymous information that is readable and blocks of encrypted information that is not readable.

Figure 16:
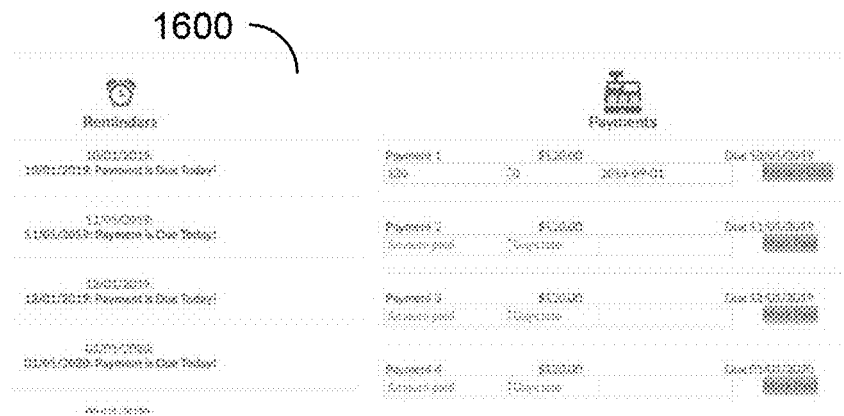
FIG. 16 illustrates information supplied to a vendor in accordance with an embodiment of the invention.

FIG. 16 illustrates an interface 1600 that may be supplied by the anonymous marketplace platform 142 to one or more vendor machines 150_1 through 150_N. The interface 1600 includes transaction reminders and transaction payment history. This data is also reported back to the client application 122. The user may then report the data to server 104 as anonymous user data reflecting payment history.

Figure 17:
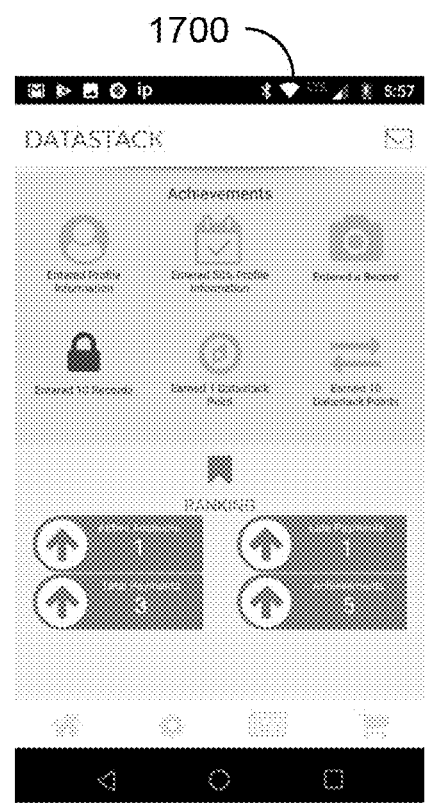
FIG. 17 illustrates a user interface summarizing user status information.

FIG. 17 display an interface 1700 that may be supplied by the anonymous marketplace platform 142 to the client application 122 for display on client device 102. The interface 1700 provides data stack information characterizing the activity of a user.

Thus, the invention provides trustworthy financial underwriting, secure storage and brokering of sensitive private information, prevents discrimination in lending, prevents fraudulent user activity and prevents a repository of sensitive information that can be accessed by a hacker or government entity.

The invention allows users to monetize their personal data under their control. This is accomplished without handing over this sensitive information to a third-party, such as the operator of server 104.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   receiving anonymous entity information from a client device via a network;
   using the anonymous entity information to register a user associated with the client device;
   receiving from the network user supplied anonymous information about the user;
   collecting via the network sensor signals from the client device;
   combining the user supplied anonymous information with the sensor signals to produce an anonymized data package for the user;
   making the anonymized data package accessible to vendor machines via the network;
   collecting from the network transaction offers from the vendor machines;
   supplying the transaction offers to the user device via the network;
   receiving from the user device a selected transaction offer via the network; and
   coordinating via the network communication between the user device and a vendor machine associated with the selected transaction offer.

2. The computer implemented method of claim 1 wherein the anonymous entity information is a hash value from a one-way cryptographic hash function of a user name and password.

3. The computer implemented method of claim 1 further comprising processing the sensor signals to characterize actions of the user.

4. The computer implemented method of claim 1 wherein the anonymized data package for the user includes visible anonymous information and encrypted sensitive personal information.

5. The computer implemented method of claim 1 further comprising prompting the user for parameters for collecting sensor signals.

6. The computer implemented method of claim 1 further comprising prompting the user to specify data analysis rules.

7. The computer implemented method of claim 6 further comprising prompting the user to combine data analysis rules to establish a proprietary data analysis used to determine whether to extend a transaction offer to the user.

8. The computer implemented method of claim 1 further comprising prompting the user to supply encrypted sensitive personal information.

9. The computer implemented method of claim 8 further comprising coordinating with the vendor machine access to the encrypted sensitive personal information.

10. The computer implemented method of claim 1 further comprising supplying the user with data on forthcoming and past transaction events.

* * * * *